US008218046B1

United States Patent
Tashiro (10) Patent No.: US 8,218,046 B1
(45) Date of Patent: Jul. 10, 2012

(54) MONOCHROME/COLOR DUAL-SLOPE TRAFFIC CAMERA SYSTEM

(75) Inventor: Kenji Tashiro, San Jose, CA (US)

(73) Assignee: Jai, Inc. USA, San Jose, CA (US)

( * ) Notice: Subject to any disclaimer, the term of this patent is extended or adjusted under 35 U.S.C. 154(b) by 456 days.

(21) Appl. No.: 12/640,275

(22) Filed: Dec. 17, 2009

(51) Int. Cl.
*H04N 3/14* (2006.01)
*H04N 5/335* (2011.01)
*H04N 7/18* (2006.01)
*H04N 5/235* (2006.01)
*G03B 7/00* (2006.01)

(52) U.S. Cl. ........ 348/297; 348/149; 348/296; 348/308; 348/362; 348/366

(58) Field of Classification Search .................. None
See application file for complete search history.

(56) References Cited

U.S. PATENT DOCUMENTS

| 6,008,486 | A * | 12/1999 | Stam et al. ................. 250/208.1 |
| 6,069,377 | A * | 5/2000 | Prentice et al. .............. 257/292 |
| 6,977,685 | B1 * | 12/2005 | Acosta-Serafini et al. ... 348/308 |
| 7,327,393 | B2 * | 2/2008 | Ying et al. ..................... 348/308 |
| 7,567,291 | B2 * | 7/2009 | Bechtel et al. ................ 348/370 |
| 2003/0103141 | A1 * | 6/2003 | Bechtel et al. ................ 348/148 |
| 2004/0021058 | A1 * | 2/2004 | Drowley et al. ........... 250/208.1 |
| 2005/0167602 | A1 * | 8/2005 | Dierickx ................. 250/370.01 |

* cited by examiner

*Primary Examiner* — Peter-Anthony Pappas
*Assistant Examiner* — Carlos Perez Toro
(74) *Attorney, Agent, or Firm* — Law Office of Thomas E. Schatzel, A Prof. Corp.

(57) ABSTRACT

A video traffic system comprises a dual-slope, high dynamic range CMOS camera. Shutter, gain, and pedestal control and set-points for the dual-slope integration knee threshold and trigger time are computed from an operational model of the camera response using an input from a wireless light sensor. Darker pixels can integrate over the full shutter period, but bright pixels that are integrating too quickly and will saturate are reset to an adjustable level around 78% of maximum. Such reset occurs at an adjustable time about 93% of the full shutter period. The bright pixels are released to integrate from that point until the shutter closes.

10 Claims, 6 Drawing Sheets

MONOCHROME/COLOR DUAL-SLOPE TRAFFIC CAMERA SYSTEM

FIELD OF THE INVENTION

The present invention relates to electronic imaging devices, and more particularly to light sensor controlled cameras in video traffic system applications that extend the dynamic range of their CMOS camera sensors with independent control of individual photodiode integration resets.

DESCRIPTION OF THE PRIOR ART

In CCD and CMOS digital cameras, images are captured by photodiodes that convert light from an object into an electronic signal image sensor. The amount of signal generated by each pixel in the image sensor depends on the amount of light its photodiode integrates, both in terms of the light intensity and the duration of the light collection. The light intensity can be limited with smaller apertures, and the duration of light collection can be limited with shorter shutter times. Digital cameras use either an external mechanical shutter in front of the image sensor, or an on-chip electronic shutter.

Video Traffic Systems are used to read and identify car license plates in toll collection, section control, red-light enforcement, and speed enforcement applications.

The cameras used must capture each license plate image with the best character contrast with its background. Over-saturated and under-saturated images lack the necessary contrast. Cameras used in highly variable lightning conditions, like day/night, and with a variety of license plate types need a very high dynamic range in order to provide good contrast in every frame. Predicting the correct exposure times for each picture is difficult, and the very high dynamic range is needed when exposures are less than optimum.

External light sensors are a first step in getting the best character contrast in Video Traffic Systems. One type runs a cable out to a light sensor near where car traffic will be passing by. A two-sided white reflective target is oriented vertically and laterally similar to the orientation of the license plates that will be passing on cars. Light sensor devices on both sides of the two-sided white reflective target can then be used to sample the amount of light that will be reflected by both the front and back license plates. Conventional automatic gain control (AGC), automatic exposure (AE), and automatic iris (AI) can respond to the light from the horizontal road surfaces, but what is needed is an estimate of the light on vertical surfaces oriented the way a passing vehicle license plate would be. And expecting a good reading from a fast moving car as it passes by just doesn't provide enough time to set the camera and take the image.

At night, such light sensors do not provide any help. Variations in the retro-reflectiveness and the imaging angles of licenses plates can cause over-saturation of the images. Higher dynamic ranges of the image sensors is needed to avoid over-saturation of license plate images.

United States Patent Application 2006/0181624, titled WIDE DYNAMIC RANGE OPERATION FOR CMOS SENSOR WITH FREEZE-FRAME SHUTTER, describes combining a short integration followed by a long integration to obtain a wide dynamic operation range. The intra-scene dynamic range of images is extended by combining the image taken with a short exposure time with the image taken with a long exposure time. A freeze-frame pixel can be based on voltage sharing between a photo detector and an analog memory. The resulting voltage in the memory may be a linear superposition of the two signals representing a bright and a dark image after two operations of sampling.

U.S. Pat. No. 7,079,178, Jul. 18, 2006, by Jaroslav Hynecek, titled HIGH DYNAMIC RANGE ACTIVE PIXEL CMOS IMAGE SENSOR AND DATA PROCESSING SYSTEM INCORPORATING ADAPTIVE PIXEL RESET, describes a high Dynamic Range Active Pixel CMOS image sensor with an adaptive pixel reset. The individual sensor pixels are reset early when an accumulated charge, or the integration time exceeds predetermined levels. The reset is skipped if the integrated charge signal in a given pixel is lower than the predetermined level. An accumulated number of reset skips in a given shutter exposure, together with the standard analog output, is used to calculate a high dynamic range sensor output signal. A signal processing system is used to simultaneously process both the sensor analog and digital outputs.

SUMMARY OF THE INVENTION

Briefly, a video traffic system embodiment of the present invention comprises a dual-slope, high dynamic range CMOS camera. Shutter, gain, and pedestal control and set-points for the dual-slope integration knee threshold and trigger time are computed from an operational model of the camera response using an input from a wireless light sensor. Darker pixels can integrate over the full shutter period, but bright pixels that are integrating too quickly and will saturate are reset. The bright pixels are released to integrate from that point until the shutter closes.

These and other objects and advantages of the present invention will no doubt become obvious to those of ordinary skill in the art after having read the following detailed description of the preferred embodiments which are illustrated in the drawing figure.

DETAILED DESCRIPTION OF THE PREFERRED EMBODIMENT

Figure 1:
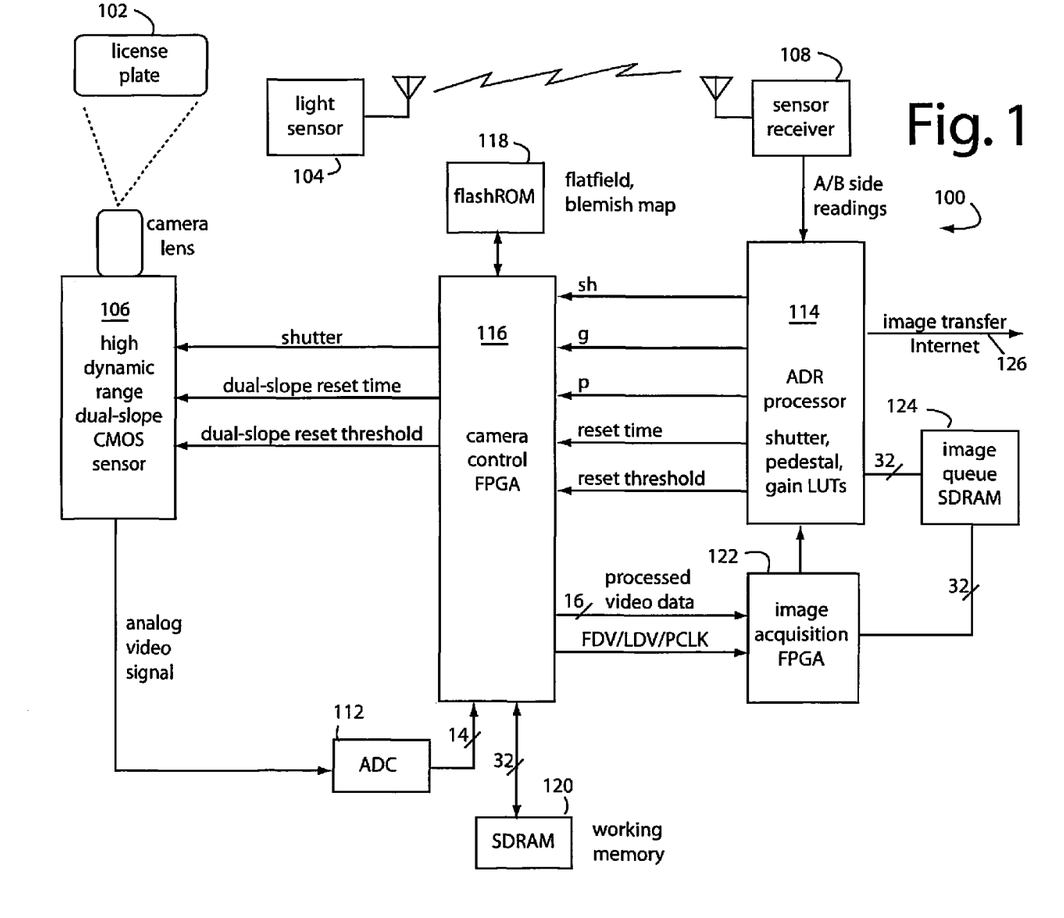
FIG. 1 is a functional block diagram of a video traffic system embodiment of the present invention.

A video traffic system embodiment of the present invention is illustrated in FIG. 1 and is referred to herein by the general reference numeral 100. The video traffic system 100 provides high contrast images of vehicle license plates 102 as they drive by an outdoor observation station. The lighting environment is highly variable, and good images must be obtained day/night, summer/winter, and cloudy/clear skies. A wireless light sensor 104 helps set the daylight exposure times of a camera 106 by providing sample readings of the light conditions out near the observation station.

The wireless light sensor 104 includes a vertical, white target plate that simulates a typical license plate, and the white target plate is oriented with traffic to match that of the passing license plates on cars from the camera's perspective. Light on both the front and back sides of the white target plate is measured for instances where two cameras are used to catch images of the front and back license plates on the cars. The sun angles will be different from each camera's perspective. The wireless light sensor 104 is powered by solar cells and batteries, and has a wireless transmitter to simplify installation in the field by not requiring cabling or wiring.

Figure 2:
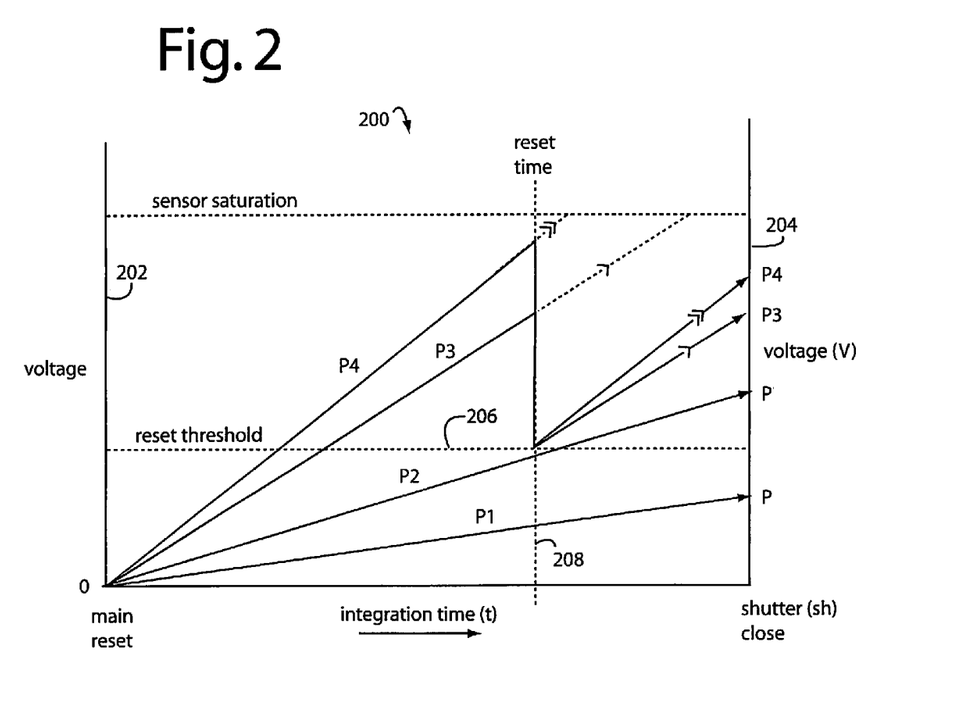
FIG. 2 is a graph that helps explain a dual-slope method embodiment of the present invention for integrating and resetting photodiodes in CMOS sensors according to how much light they have already collected for a pixel by a reset or retrigger time.

Camera 106 includes a dual-slope CMOS sensor in which the integration times of individual photodiodes are independently foreshortened automatically whenever the corresponding pixel is nearing saturation. The darker pixels will be unaffected by this and they are allowed to integrate during the entire shutter period. But those pixels that exceed a programmable threshold during integration have their accumulated integrations reset to an adjustable knee-point. Such reset occurs a programmable time before the shutter closes, and the brighter pixels are released to integrate more beginning at the adjustable knee-point. This differs from conventional gamma correction in which the gain applied to all pixels are manipulated as a group. FIG. 2 illustrates the response of camera 106 in more detail.

During the manufacturing of camera 106, its response to light is measured and the camera is calibrated according to formula-1, $$DV_{avg} = (t_1 \times (L_{obj}/L_{max}) \times sh \times 10^{(g \times k/20)} \times (255-p)) \quad (1)$$

where,
  $DV_{avg}$=8-bit digital video output;
  $t_1$=optics compensation factor;
  $L_{obj}$=calibrated sphere light source (fL);
  $L_{max}$=maximum illumination possible in day (fL);
  k=gain coefficient;
  sh=normalized exposure time (shutter);
  g=gain (0-255); and
  p=pedestal (0-255).

During calibration of the camera, the known variables are $DV_{avg}$, $L_{obj}$, and $L_{max}$, because they can be measured directly.

To make the logic portable to all camera models, camera 106 stores shutter (sh), gain (g), and pedestal (p) in a lookup table (LUT) disposed within ADR 114. Actual raw control values are inside the LUT, but the camera's automatic dynamic range control (ADR) logic does not deal with camera dependent parameters. All control values are rounded off to the nearest 8-bit value (0-255) in ADR logic. This makes the logic portable to any camera. Actual raw parameters inside LUT are calibrated at the factory, based on Formula-1.

In g[0:255] and p[0:255], (g) and (p) are theoretical parameters used in the factory calibration and camera operational models. The LUT translates these into the camera hardware dependent control values, G[xxx:yyy] and P[mmm:nnn], e.g., G=LUT_g(g; and, P=LUT_p(p).

The ADR 114 never directly operates the camera-dependent gain and pedestal values. In order to maintain portability regardless of the camera models, ADR 114 manipulates the gain and the pedestal parameters, ranging from 0 to 255 in 8-bit, in the factory calibration model (formula-1) and camera operation model (formula-2).

Inside individual camera hardware, the gain and the pedestal control values needed are dependent on the model of camera. The gain LUT and pedestal LUT are added as abstraction layer between the camera hardware and the ADR processor to normalize unit-by-unit and model-by-model variations.

During the factory calibration process, a software automation estimates all the table entries for the gain LUT (LUT_g) and pedestal LUT (LUT_p). When buffered by the LUTs, the ADR processor is thus enabled to deal only with the theoretical parameters (g, p), and not the individual idiosyncrasies.

Table-I illustrates a calibration program that can be used to determine the raw table values for the shutter, gain, and pedestal LUTs, and the k value.

TABLE I

1. Iris close ($L_{obj}$ = 0). Adjust pedestal such that the camera to desired black level. Save p as p[0] LUT.
2. Set p = 0. Select min sh, and max $L_{obj}$ = $L_{max}$. This is brightest day condition. Raise g until we get a target digital output (normally 220~230DN). Save g as g[0] in LUT.
3. Set p = g = 0. Select $L_{obj}$ and sh to make the $D_{avr}$ to the target value (normally 220~230DN). Raise/Lower pedestal so that the $D_{avr}$ = 127.5 (half of the range.) Save p as p[255]. Interpolate all LUT entries between p[0] and p[255] in LUT.
4. Set p = 0. Set sh = $sh_{max}$. Select minimum $L_{obj}$ = $L_{min}$. This is equal to the illumination intensity at night. Raise gain until the $D_{avr}$ becomes the target value (normally 220~230DN). Save g as g[255] in LUT. k is now known, calculated as the following;
k = 20/255 × log ((DV$_{avr}$ × L$_{max}$)/(t1 × L$_{min}$ × sh$_{max}$ × 255)), where t1 is the transmission factor of the lens and optical filters.
5. Set p = 0, sh = $sh_{max}$. Select appropriate Lobj. Given g = i, we have theoretical $DV_{avr}$ in formula-1 (k is known). Find gain value so that the camera can output the same $DV_{avr}$. Save g as g[i] in LUT. Loop i from 1 to 254.
6. Camera successfully calibrated k, g[ ] LUT, and p[ ] LUT.

In the operation of camera 106 in video traffic system 100, the independent variable is the reading obtained by light sensor 104 and forwarded to sensor receiver 108. The shutter (sh), gain (g), and pedestal (p) are then adjusted to provide an optimum value for $DV_{avg}$, as in formula-2, $$DV_{avg} = (t2(LSA/LS_{max})Sh \times 10^{(g \times k/20)} \times (255-p)) \quad (2)$$

$$Rst\_t = sh \times 0.932$$

$$Rst\_v = LUT(g)$$

where,
  $DV_{avg}$=digital video output in 8 bit;
  t2=optics compensation factor;
  LSA=light sensor A-channel reading;
  $LS_{max}$=the maximum light sensor reading possible;
  k=gain coefficient;
  sh=normalized exposure time (shutter);
  g=gain (0-255); and
  p=pedestal (0-255).
  Rst_t=dual-slope reset time. 93.2% of exposure.
  Rst_v=dual-slope reset threshold. A look-up table is used based on gain.

The solutions for sh, g, and p are not unique. The longest exposure time to maximize the SNR of the image and minimum gain. The brightness is adjusted by setting the longest shutter time (sh) first, e.g., to no more than one millisecond to avoid motion blur, typically five hundred microseconds. The smallest gain (g) is chosen, and forwarded to device 110. The pedestal (p) sets the black level. The dual-slope parameters are initialized with the bright integration reset time placed at 93.2% of the shutter time (sh), and the voltage to reset the bright integration to is adjusted to be about 72.7% of the estimated white saturation voltage. The white saturation voltage depends on estimated gain. The reset threshold is dependent on estimated gain. A look-up table based on gain is the simplest approach inside the camera.

The consequence of this is the dual-slope transfer characteristic of each pixel in camera 106 will have a knee at 78% (0 to L), and increase the dynamic range to about 4 times what it was before. The top three quarters (L to 4L) of the dynamic range will be compressed into the 22% remaining above the 78% part.

An automatic dynamic range control (ADR) processor 114 computes five set-points, sh, g, p, reset-time, and reset threshold from the light sensor reading. These are forwarded to a camera digital gain control, field programmable gate array (FPGA) 116. Camera control FPGA 116 digitally adjusts the pedestal (p) and gain (g) The shutter (sh), reset-time, and reset threshold, are passed to the camera 106 so that it is ready to take pictures the instant a license plate 102 passes by. The analog output signal from camera 106 is a raw image, and converted for digital processing by ADC 112. A flash memory 118 stores templates to remove known blemishes in the CMOS sensor images, and any flatfield corrections needed. Data maps from a flashROM 118 are loaded to an SDRAM 120 to allow FPGA 116 to do blemish and flatfield correction in real-time.

The processed video data, field data valid (FDV), line data valid (LDV), and pixel clock (PCLK) are generated for an image acquisition FPGA 122. The images build up in an image queue SDRAM 124 and are transferred out on an Ethernet port 126, e.g., to the Internet.

FIG. 2 illustrates a method 200 of dual-slope integration used in CMOS sensor camera 106 of FIG. 1. Other dual-slope methods that provide high dynamic ranges may also be useful. For simplicity, four pixels P1-P4 are selected from millions in a typical CMOS sensor to illustrate how each pixel's photodiode responds to various levels of light. In this example, and in the corresponding circuit of FIG. 3, each of pixels P1-P4 is receiving a different level of light, e.g., brightest, bright, dark, and darkest, respectively. A main reset 202 occurs at a time-0, and is effectively when the electronic shutter is opened on the CMOS sensor. All four pixels start integrating the light they each independently receive, but P4 does it more quickly and with a steeper slope because it is receiving the brightest light. Pixel P1 builds up the slowest during integration because it is receiving the darkest light.

The amounts of light being received and integrated by pixels P1 and P2 are in no danger of saturation by the end of the integration period, e.g., shutter close 204. But pixels P3 and P4 will saturate because their integration slopes are so steep. A dual-slope reset threshold 206 is used to determine which pixels should be reset to a setpoint level equaling threshold 206 when a dual-slope reset time 208 occurs.

In the example of FIG. 2, only pixels P1 and P2 have not exceeded reset threshold 206 at reset time 206. They will be allowed to continue their normal integration.

But pixels P3 and P4 have already exceeded reset threshold 206 before reset time 208. So every pixel's photodiode integration voltage that exceeded the threshold 206 by reset time 208 is immediately clipped down to the voltage level of reset threshold 206. The affected integrations are released and allowed to resume integrating at their original rates from rest time 208 until shutter close 204. The result is the top scale of the final integrations of all pixels P1-P4 will be compressed, compared to the part from P2 down to zero.

Experiments have shown that set-points for reset threshold 206 at 72.7% of white saturation voltage, and reset time 208 at 93.2% of shutter close 204 will produce a good starting point. These values should be adjustable, and tuned during use for optimum results and best image character contrast.

Figure 3:
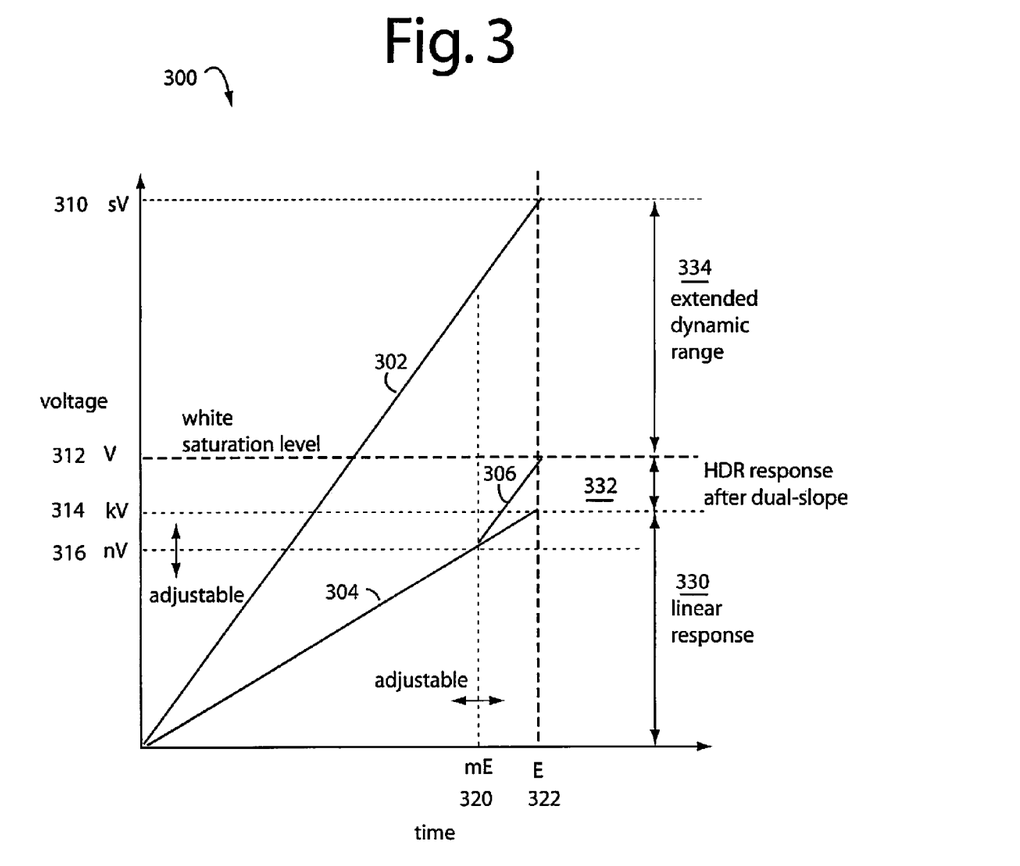
FIG. 3 is another graph that helps explain dual-slope operation in embodiments of the present invention.

FIG. 3 represents a dual-slope response 300. An effective dynamic range of a slope 302 can be approximated by a dual-slope response comprising slopes 304 and 306. The joint between slopes 304 and 306 is a knee that can be manipulated to optimize dual slope performance. An extended range voltage (sV) 310 is well above the white saturation level (V) 312. Maximum linear response voltage (kV) 314 is such that k=n/m, where a knee voltage (nV) 316 is adjustable, as is a dual-slope reset time (mE) 320. The exposure time is (E) 322. So the extended dynamic range (sV) 310 is such that s=(1−n)/(1−m). Here, the two control parameters are reset time (m) and reset threshold (n). By optimizing (m,n), the best knee point can be chosen.

A linear response range 330 (0-nV) transitions into a high dynamic range (HDR) response 332 (nV-V) and an extended dynamic range 334 (V-sV).

A first design consideration is how much dynamic range is required. From experiments conducted with retro-reflective US and European license plates, a dynamic range of four times (12-dB) was required whenever ambient light sensor estimation was incorrect. Worst case is when the license plate is in the full-sun of mid summer, while the light sensor is in shade. Therefore, we select s=4.0

Another design consideration is how much linear response range 330 will be needed. Contrast is better in the linear response region 330 than HDR region 332. However, white saturation is faster. Ideally, linear response should be as wide as possible, and the HDR region 332 is added only for insurance. Therefore, k=78% of V. Given s=4.0, and k=0.78, then m=0.932, and n=0.727 are probably the optimal system parameters.

Figure 4:
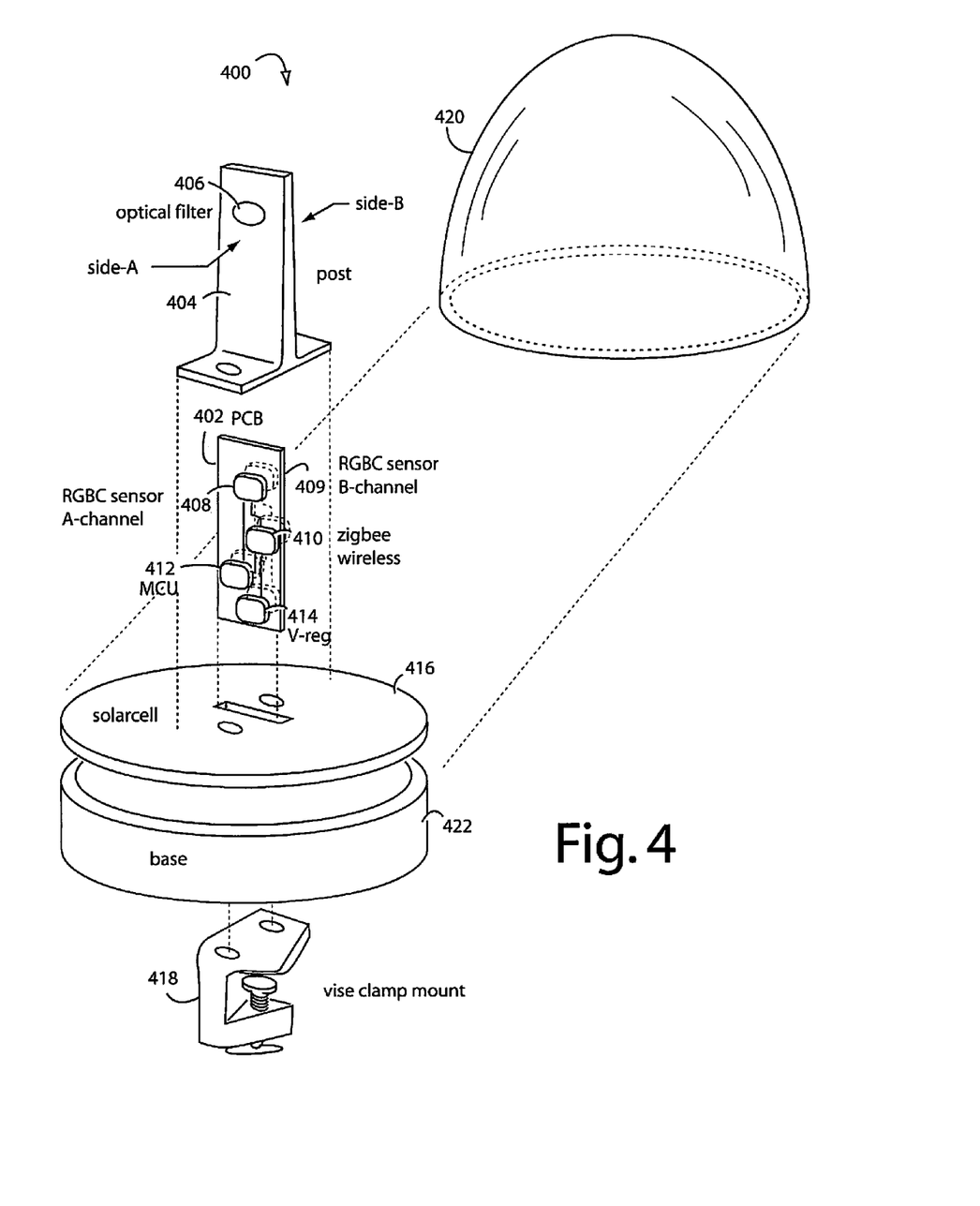
FIG. 4 is a perspective view diagram of a low-cost, low-power light sensor system embodiment of the present invention that can be used with the video traffic system of FIG. 1.

FIG. 4 represents a low-cost, outdoor light sensor system 400, which can be used in system 100 (FIG. 1). Light sensor system 400 provides dynamic color white balance tracking, and is easy to install because no network cabling or utility power is needed. Light sensor system 400 has a vertically mounted printed circuit board (PCB) 402 that fits inside a protective plastic post 404. A light filter 406 is mounted on both sides and passes light through to surface mount technology (SMT) four-channel color light sensors 408 and 409 on each side of PCB 402. Light sensor 408 provides side-A information, and light sensor provides side-B information. These measure red, green, blue, and clear (white) light, looking in the same lines of sight camera 106 would when imaging license plates 102. For example, an Avago Technologies (San Jose, Calif.) model ADJD-S311-CR999 4-channel RGBC digital color sensor could be used.

The color SMT light sensors 408 allow color temperatures to be measured for white balance tracking. The color temperature can vary from 3000° K to 7000° K, as the day changes from morning to clear midday to overcast and evening.

A wireless processor 410 and an application microcontroller unit (MCU) 412 receive A-channel and B-channel light measurements from corresponding four-channel color light sensors 408 (channel-A) and 409 (channel-B), and transmit them to a nearby camera. The A-channel can represent the outdoor lighting conditions a camera will see. The light sensor is placed such that its A-channel faces in the same direction as the target license plates. So the B-channel faces in the opposite direction. If front and rear views are required of the same car, two cameras can share one light sensor 104 because the front and rear license plates are parallel to one another.

Wireless processor 410 can be a Texas Instruments Incorporated (TI) Z-Accel CC2480 2.4 GHz ZigBee-certified network processor. The CC2480 provides complete ZigBee functionality and handles all the timing-critical and processing-intensive ZigBee protocol tasks, the resources of the application MCU 412 free to handle the application. The CC2480 communicates with the MCU 412 via an SPI or UART interface. The CC2480 supports SimpleAPI, which has only ten API calls to learn, and features excellent radio performance, low power consumption and an automatic low-power mode in idle periods.

The ZigBee protocol (Zigbee Alliance, www.zigbee.org) is a worldwide open standard for low-cost, low-power, wireless connectivity for a wide range of monitoring and control applications. It builds on the IEEE 802.15.4 standard for packet-based, wireless transport. ZigBee provides flexible, extendable network topologies with integrated setup and routing intelligence to facilitate easy installation and high resilience to failure. ZigBee networks also incorporate listen-before-talk and rigorous security measures that enable them to co-exist with other wireless technologies, such as Bluetooth and Wi-Fi.

The range of Zigbee radio transmission is dependent on the operating environment. A range of more than 450 meters can typically be achieved outdoors. The range between devices can be extended in a ZigBee network through the use of intermediate routers.

A voltage regulator 414 powers the other electronics using a photovoltaic solar battery panel 416 as a source. A vise clamp type mount 418 provides a quick, simple, and inexpensive means to install the light sensor system 400 near a lane of vehicle traffic. A clear dome 420 and a base 422 can be added if low-cost is not a concern, or if the environment is too harsh.

In one set of experiments, the dual-slope implementation described by FIG. 2 had a first slope that was linear up to 78% (200/255) of the maximum range (255/255) of ADC 112. The second slope included a 4× dynamic range. The reset time 208 was generated at 93.2% of main reset 202 to shutter close 204, and the reset voltage 206 was 72.7% of the white saturation voltage. The exposure time (sh) and gain from camera control FPGA 116 was updated every 100-milliseconds from new readings obtained from light sensor 104. This scheme represented a best balanced approach, and avoided oversaturation in the second slope, while maintaining the longest first slope to avoid contrast loss of the license plate characters in cases where the light sensor estimation was correct. Such will provide an acceptable input for license plate recognition (LPR) software even if the light sensor estimation is not entirely correct.

Dual-slope color CMOS sensors do not maintain color linearity, the white balance breaks after the second knee. Typically, such an image would appear green or pink in the brighter areas. A color correction process can be used to mitigate this problem.

Given a light sensor value, a camera's ADR logic can calculates the optimal shutter, gain, and pedestal. Given the optimal gain, the white saturation voltage is estimated, and then the dual-slope reset threshold voltage 314 (FIG. 3) is set to 72.7% of saturation voltage 312. Dual-slope reset timing 320 is 93.2% of exposure time 322. Since the knee point 316 is known, the camera can determine which pixels bypass dual-slope, or must be reset by dual-slope.

If Reset time=m×E
  Reset voltage=n×V,
where E=Exposure time,
  V=saturation voltage at given digital gain, Then the linear pixels that bypass dual-slope range [0~n/m]. If m=93.2%, and n=72.7%, for the best solution, the linear pixel range 330 can be up to 72.7/93.2=0.78 (78%). For cameras with 12-bit internal logic, the camera can determines that pixels below 3194-decimal will bypass dual-slope, and pixels above that get reset by the dual-slope. For each R, G and B channels, the camera corrects the pixel value based on state of the pixel, bypass or reset.

Figure 5:
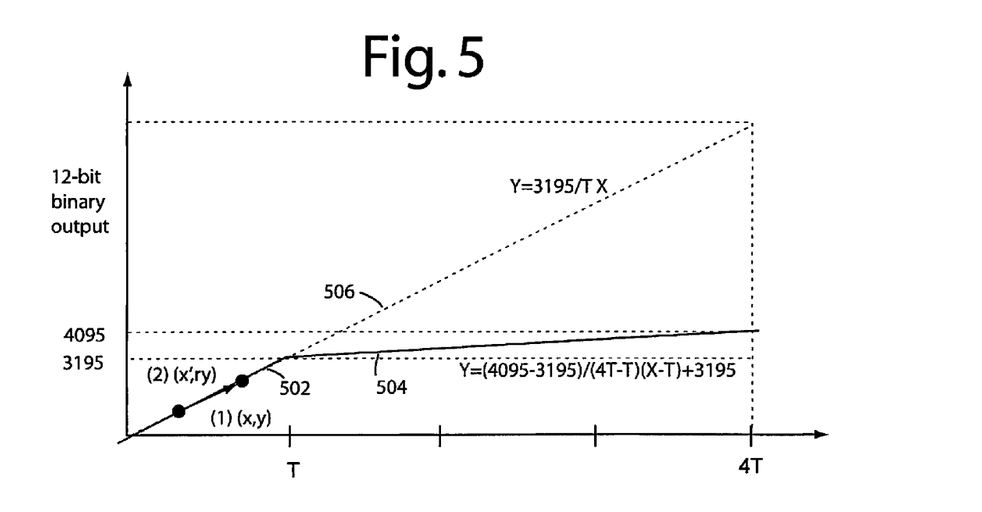
FIGS. 5-7 are graphs of sensor voltage versus exposure times that demonstrate and illustrate how different white balances are applied based on the locations of the signal, whether it's on a first slope or a second slope, for example.
Figure 6:
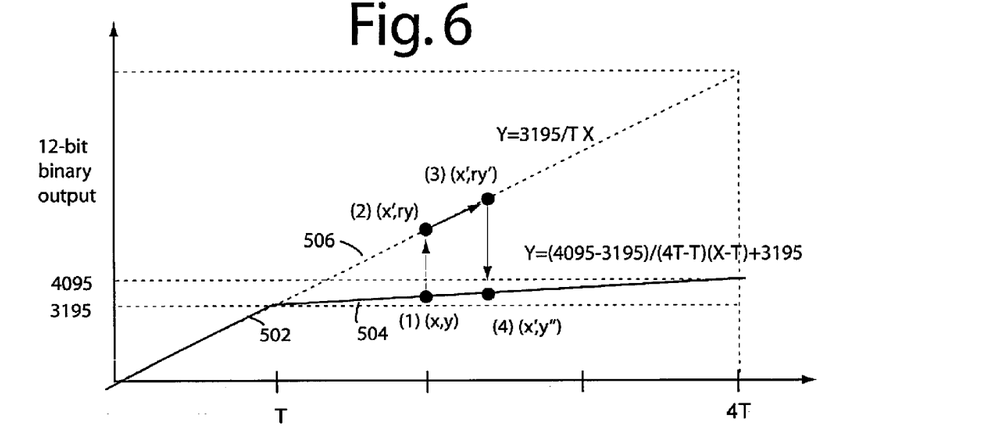
Figure 7:
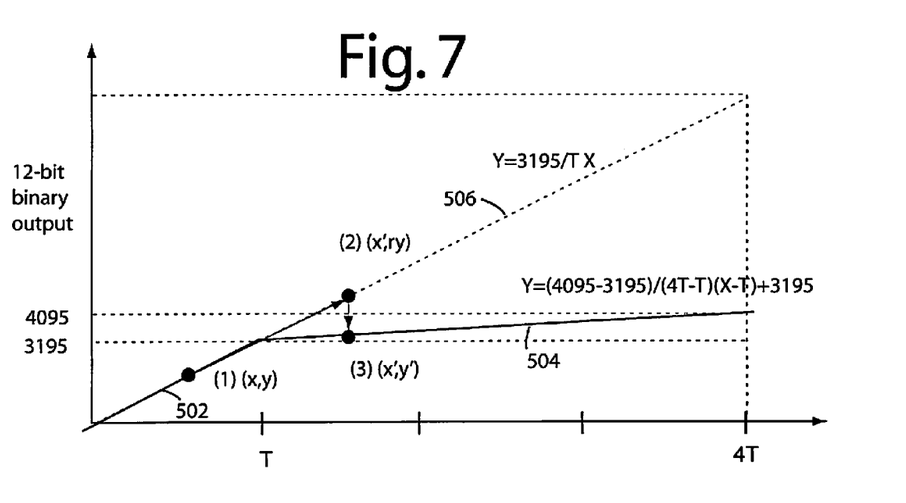

FIGS. 5-7 demonstrate and illustrate how different white balances are applied based on the locations of the signal, whether it's on a first slope 502 or a second slope 504, for example. From experiments conducted in white balance, green (G) was always the strongest signal. Blue (B) and red (R) were less. In experiments with dual-slope, the saturation level of each sensor is known. Assuming, $R_{gain}>1.0$, $B_{gain}>1.0$, the knee point of first slope with second slope is X=dual-slope-reset timing, and Y=dual-slope-reset voltage. For X: Dual-slope-Reset Timing, the first slope is up to one-fourth of exposure time (four times dynamic range). For Y: Dual-slope-Reset Voltage First slope is up to 78% of the saturation level=3195-decimal.

In FIG. 5, R and rR are on the same first slope 502. In FIG. 6, an R or B pixel is on the second slope 504. In FIG. 7, R or B pixel is on the first slope 502, but rR or rB is on the second slope 504.

Giving white balance to pixels on the first slope 502 is simple and can be applied directly, as illustrated in FIG. 5, point (1)(x,y) to point (2)(x',ry), where y is the measured grayscale. Suppose $R_{gain}=r>=1.0$, $B_{gain}=b>=1.0$. If y<3195, and ry<3195, then both point (1) and point (2) are on the first slope 502. $R_{gain}$ can be linearly applied.

New $R_{value}=rR$, where $r=R_{gain}>=1.0$

New $B_{value}=bB$, where $b=B_{gain}>=1.0$

But if the pixel at point (1)(x,y) is on the second slope 504, as illustrated in FIG. 6, the linear continuation 506 of the first slope 502 is used to apply the white balance from point (2)(x',ry) to point (3)(x',ry'). Then the pixel value is reinstated to its corrected place at point (4)(x',y") on the second slope 504. For the second slope 504, $y=900/(3T)(x-T)+3195$; and $x=(y-2895)*T/300$.

Point (2) is on the extended first slope 506, $y'=3195/Tx=3195/T*(y-2895)*T/300=3195/300(y-2895)$.

For point (3), apply $R_{gain}$ or $B_{gain}$. Since $R_{gain}$ and $B_{gain}$ are both greater than 1.0, a new point (3) will move toward the right on the extended first slope 506, $ry'=3195/Tx'$ $x'=rT/3195y'=rT/3195*3195/300(y-2895)=rT(y-2895)/300$ Since point (4) is on the second slope 504, $y''=300/Tx'+2895=300/T*rT*(y-2895)/300+2895=r(y-2895)+2895$.

So if $y \geq 3195$, point (1) is on the second slope 504, the new grayscale after applying Rgain will be, New $R_{value}=r(R-2895)+2895$, where $r=R_{gain}>=1.0$;

New $B_{value}=b(B-2895)+2895$, where $b=B_{gain}>=1.0$.

FIG. 7 this is a case where pixel R (or B) is on the first slope 502, but rR (or bB) is on the second slope 504.

Point (1) Given, $$R_{gain}=r \geq 1.0, B_{gain}=b \geq 1.0;$$

$$y=3195/Tx; \text{ and}$$

$$x=T/3195y.$$

For point (2), the process is to apply $R_{gain}$ or $B_{gain}$. Since $R_{gain}$ and $B_{gain}$ are both greater than 1.0, a new point (3) will move toward right on the extended first slope 506. Therefore, $$ry'=3195/Tx'; \text{ and}$$

$$x'=T/3195ry'.$$

Point (3) is on the second slope 504. Therefore, $$y'=300/Tx'+2895=300/T*T/3195ry'+2895=0.0938967*ry'+2895$$

From above, if y<3195 and ry≥3195, or in other words, if Point (1) is on the first slope 502, and point (2) is on the second slope 504, then the new grayscale after applying $R_{gain}$ will be, $$\text{New } R_{value}=0.0938967rR+2895, \text{where } r=R_{gain} \geq 1.0; \text{ and}$$

$$\text{New } B_{value}=0.0938967bB+2895, \text{where } b=B_{gain} \geq 1.0.$$

When using such color correction algorithm, the white balance will function properly, even if for pixels that are reset by the dual-slope action. Such logic is preferably implemented with a portion of FPGA 122 (FIG. 1).

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A video traffic system, comprising:
    a dual-slope, high dynamic range CMOS camera with photodiodes that integrate the darker pixels over the full shutter period, but that reset the integration of bright pixels to an adjustable percentage of maximum;
    a light sensor for positioning outdoors in an area to be imaged by the CMOS camera, and for providing a white plate measurement of the lighting conditions near an image target;
    an automatic dynamic range (ADR) processor for computing, from a measurement returned by the light sensor, an optimum set of shutter, dual-slope integration reset time, and dual-slope integration reset thresholds for the CMOS camera to avoid oversaturation of said image; and
    an output for image transfer.

2. The system of claim 1, wherein the CMOS camera further includes a calibration obtained in the manufacturing of the CMOS camera and its response to light according to, $$DV_{avg}=(t1 \times (L_{obj}/L_{max}) \times sh \times 10^{(g \times k/20)} \times (255-p)$$

where,
    $DV_{avg}$=digital video output;
    $L_{obj}$=Calibrated Sphere Light Source (fL);
    t1=optics compensation factor;
    $L_{max}$=maximum illumination possible in day (fL);
    k=gain coefficient;
    sh=normalized exposure time (shutter);
    g=gain (0-255); and
    p=pedestal (0-255).

3. The system of claim 2, wherein the calibration obtained is such that the known variables are $DV_{avg}$, $L_{obj}$, and $L_{max}$, because they can be measured directly, and software estimated an ideal balance amongst settings for the gain coefficient (k), the normalized exposure time (sh), gain (g), and the pedestal (p).

4. The system of claim 1, wherein the CMOS camera further includes an input to receive a reading obtained by the light sensor, and has outputs for shutter (sh) and gain (g) that are adjusted to provide an optimum value for $DV_{avg}$, as in, $$DV_{avg}=(t2 \times (LSA/LS_{max}) \times sh \times 10^{(g \times k/20)} \times (255-p)$$

where,
    $DV_{avg}$=digital video output;
    t2=optics compensation factor;
    LSA=Light sensor A-channel reading;
    $LS_{max}$=Maximum light sensor reading possible;
    k=gain coefficient;
    sh=normalized exposure time (shutter);
    g=gain (0-255); and
    p=pedestal (0-255).

5. The system of claim 1, wherein the ADR processor is such that the brightness is adjusted by setting a shutter time (sh) first, to no more than one millisecond, then a gain (g) is chosen, and a pedestal (p) is used to set a black level.

6. The system of claim 1, wherein the ADR processor is such that its dual-slope parameters are initialized with a bright integration reset time placed at 93.2% of a shutter time (sh), and a voltage to reset said bright integration to is adjusted to be about 72.7% of estimated CMOS video saturation voltage.

7. A method of high dynamic range camera operation in which:
    shutter control and set-points for a dual-slope integration knee threshold and trigger time are computed from an operational model of a camera response using an input from a wireless light sensor;
    wherein, darker pixels can integrate over a full shutter period, but bright pixels that are integrating too quickly and that will saturate are reset to an adjustable level some percentage of maximum; and
    wherein a reset occurs at an adjustable time some percentage of the a shutter period, such that any bright pixels are released to integrate from that point until said shutter closes.

8. The method of claim 7, further comprising:
    setting a first slope that is linear up to 78% (200/255) of a maximum range (255/255) of analog-to-digital converter attached to a CMOS camera;
    setting a second slope to include a 4× dynamic range;
    generating a reset time at 93.2% of a main reset to shutter close; and
    set-pointing a reset voltage to 72.7% of a white saturation voltage.

9. The method of claim 7, further comprising:
    updating exposure time (sh) and gain every 100-milliseconds from new readings obtained from a light sensor; and
    providing an image input for a license plate recognition (LPR) software that succeeds even if a light sensor estimation is not entirely correct.

10. The method of claim 7, further comprising:

setting a first slope that is linear up to a predetermined percentage of a maximum range of analog-to-digital converter attached to a CMOS camera;

setting a second slope to include a multiple dynamic range;

generating a reset time at a predetermined percentage of a main reset to shutter close;

set-pointing a reset voltage to a predetermined percentage of a white saturation voltage; and color correcting by applying white balances that depend on the locations of pixels on said first slope or said second slope.

* * * * *